Oct. 22, 1957   A. A. SCHREINER   2,810,432
BEAD SEATING DEVICE FOR TUBELESS TIRES
Filed March 23, 1955
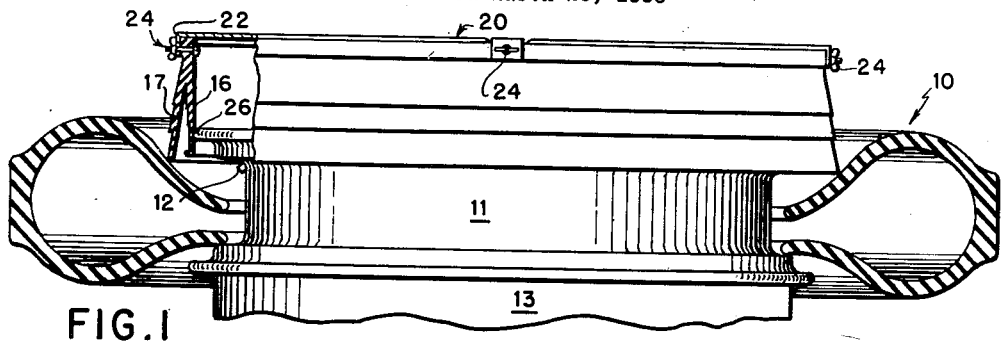
FIG.1
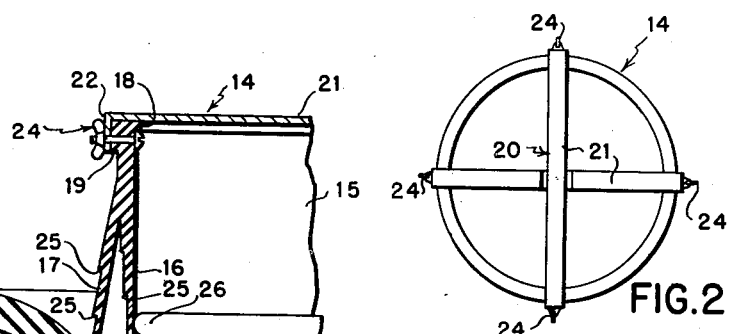
FIG.2
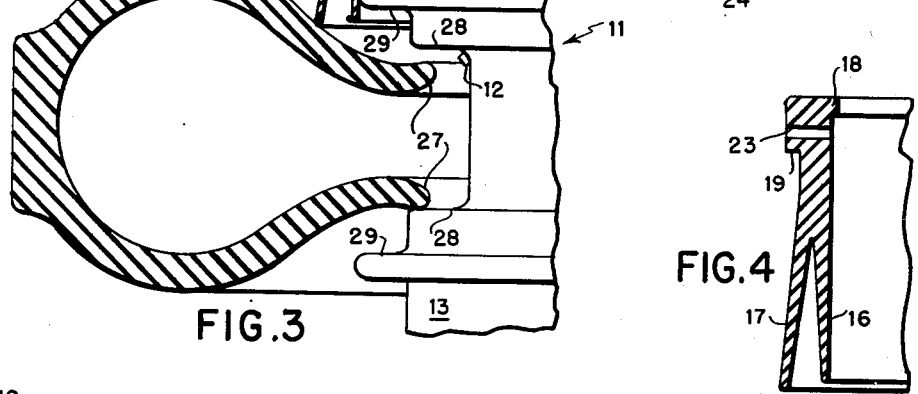
FIG.3
FIG.4
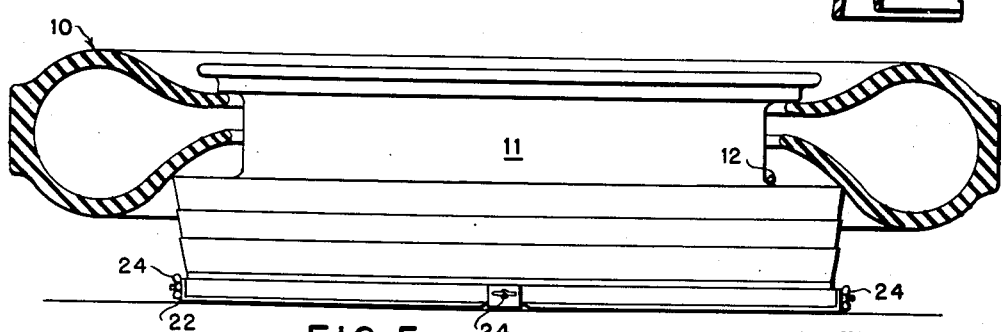
FIG.5
INVENTOR.
Alexander Anthony Schreiner
BY
Frank Makara
ATTORNEY 2,810,432

BEAD SEATING DEVICE FOR TUBELESS TIRES

Alexander Anthony Schreiner, Union, N. J.

Application March 23, 1955, Serial No. 496,197

1 Claim. (Cl. 157—1.1)

This invention relates to a mounting device for tubeless tires.

It is an object of this invention to provide a mounting device adapted to facilitate the mounting of tubeless tires upon a rim adapted thereto.

It is another object to provide a mounting device adapted to engage a tubeless tire and a mounting rim and to trap compressed air therebetween.

It is a further object of this invention to provide a mounting device of inexpensive construction adapted for rapid mounting of a tubeless tire upon a rim.

These and other objectives of this invention will become apparent upon reading the following disclosure taken in conjunction with the drawing in which, Fig. 1 is a front view of the device broken away in part to show the double skirt construction thereof, and showing the manner of using the device in co-action with a tubeless tire shown in section and a centrally disposed mounting rim or wheel, Fig. 2 is a top view of the mounting device, Fig. 3 is an enlarged detail view showing the tire in the process of being inflated and showing the wheel rim mounted on a stand, Fig. 4 is a cross-section of a modified mounting device, and Fig. 5 shows the manner of mounting a tubeless tire and wheel rim upon a mounting device placed upon a floor.

Turning to the drawing, a tubeless tire 10 is disposed loosely over a steel co-acting rim 11 having an air valve inlet 12 thereon. The rim 11 may be mounted on a stand 13. However, preferably the mounting device is placed upon the floor and the rim and tubeless tire placed thereupon (Fig. 5) so that the weight of the tubeless tire and its co-acting rim aid in forming an air-tight seal with the skirts of the mounting device.

As shown in Figs. 2 and 3 the mounting device 14 is annular or ring-shaped and essentially consists of an annulus 15 having a double skirt. The annulus may be made of rubber or flexible plastic and is adapted to confine the compressed air between the tubeless tire and the wheel rim.

The annulus of the mounting device is provided with an inner skirt 16 adapted to engage a steel co-acting wheel or wheel rim and an outer skirt 17 adapted to engage the tubeless tire 10 in both instances the skirts when in use engage their respective co-acting rim or tire components in an air-tight manner, thereby confining the compressed air introduced through the inlet aperture 12 of a conventional tire valve.

The inner skirt 16 is preferably shorter than outer skirt 17. The two skirts unite integrally to form a circular section having a small inner circular bead 18 and a wider exterior circular bead 19 (Fig. 4.)

The beads 18 and 19 re-enforce the edge of the mounting device. Preferably a hand carriage 20 consisting of two longitudinal members 21 crossed at right angles is secured to the annulus 15.

The members 21, are preferably secured together at their common area of contact, though unsecured individual members 21 are operable.

The longitudinal members 21 have depending apertured legs 22 at each of their extremities. The annulus 15 is provided with four apertures 23 spaced 90 degrees apart and passing below bead 18 but through bead 19 (Fig. 4).

The two members 21 are criss-crossed at 90 degrees and the depending legs 22 thereof are disposed over bead 19 so that the apertures of the said legs 22 are in register with the corresponding apertures of bead 19. A conventional wing nut and bolt assembly 24 is then passed through each of the sets of co-acting apertures giving a complete mounting device 14 adapted to be lifted by one hand.

The mounting skirts 16 and 17 are preferably provided with a plurality of set-back ledges 25 to effect a rigid structure; however, tapered skirts (Fig. 4) are also operable. The angle between skirt 16 and skirt 17 may be varied depending upon the size of the tire being mounted, for example, truck tire or passenger car tire.

In mounting a tubeless tire upon a rim, the tire 10 is disposed loosely upon the rim 11 and thereupon the mounting device is placed upon the tire as shown in Fig. 1. Alternatively and preferably the mounting device is placed on the floor with the skirts pointing upwardly and the combined rim and tubeless tire disposed thereover. In either case, after the mounting device is adjusted so that the inner skirt 16 tightly engages the flange 26 of the rim 11 and the skirt 17 tightly engages the tire carcass side wall, the compressed air is introduced through valve inlet 12 until the tire beads 27 expand and engage rim walls 28. Further addition of air causes the tire to expand further until beads 27 are firmly seated against flange rim walls 29.

The mounting device is then removed having served its function of preventing loss of compressed air during the inflating step. Preferably the tip of the mounting skirt 17 is round but other configurations, such as a sloped edge or multicorrugated edge are operable.

This invention has been described by means of several embodiments but other embodiments are operable and are intended to be covered by the claim herein.

The use of a single solid annular member to seal the gap between the steel rim flange of a wheel and the tire side wall is not practical.

In other words, attempting to maintain an airtight annular seal with the edge of a single flexible tubular member against high air pressures while also attempting to maintain a second airtight annular seal with the same flexible member at a line of contact with a steel rim and in continuously moving spaced-apart relationship to the first line of sealing contact between the edge of the tubular member and said expanding tire, leads to "breaks" in the air-tight seals with consequent loss of air. In short, the use of a single flexible member to maintain two circular sealing lines of contact, each sealing line moving against a solid rough surface as the tire expands and at the same time confining high gas pressure is too much area of contact for a flexible single member to maintain.

The use of the dual skirt device of this invention however, avoids the above "breaks" because each skirt has but one sealing function, and not the two sealing functions of a single skirt tubular flexible device.

I claim:

Apparatus for inflating and mounting a tubeless tire on a tire rim when one of the beads fails to make sealing contact with the corresponding rim seating surface, comprising an integral double skirted annular pressure resisting means adapted to contactingly bridge the gap between said rim and the exterior surface of said tire sidewall including an outer skirt for making sealing contact with the exterior surface of said tire intermediate said bead and the tread portion of said tire and including an inner skirt contacting said rim to form a closed chamber including the interior of said tire, said chamber enclosing a radially inward portion of said exterior surface of said tire sidewall and leaving a substantial area of the radially outward portion of said exterior surface exposed to the atmosphere, whereby when air under pressure is admitted into said chamber, unbalanced fluid pressure forces are imposed on said tire sidewall to move said tire sidewall and its bead toward contact with said rim, said annular means being yieldable to permit said movement of said tire sidewall, said double skirt consists of a tapered shorter inner skirt element for continuous perpendicular sliding planar contact with the rim and a long tapered outer skirt element for continuous substantially perpendicular contact with the tire sidewall between the edge of said outer skirt and said tire, said annular means having a common integral top inside bead and exterior bead, said beads constituting a re-enforcement and are provided with apertures therein and handle means secured through said apertures for carrying said apparatus.

References Cited in the file of this patent

UNITED STATES PATENTS

| | | |
|---|---|---|
| 711,212 | Honiss | Oct. 14, 1902 |
| 2,272,811 | Nathan | Feb. 10, 1942 |
| 2,304,581 | Lyon | Dec. 8, 1942 |
| 2,418,849 | Polt | Apr. 15, 1947 |
| 2,597,550 | Tritt | May 20, 1952 |
| 2,692,155 | Gheen et al. | Oct. 19, 1954 |
| 2,723,869 | Cobb | Nov. 15, 1955 |
| 2,786,516 | Schreiner | Mar. 26, 1957 |